Patented Oct. 22, 1935

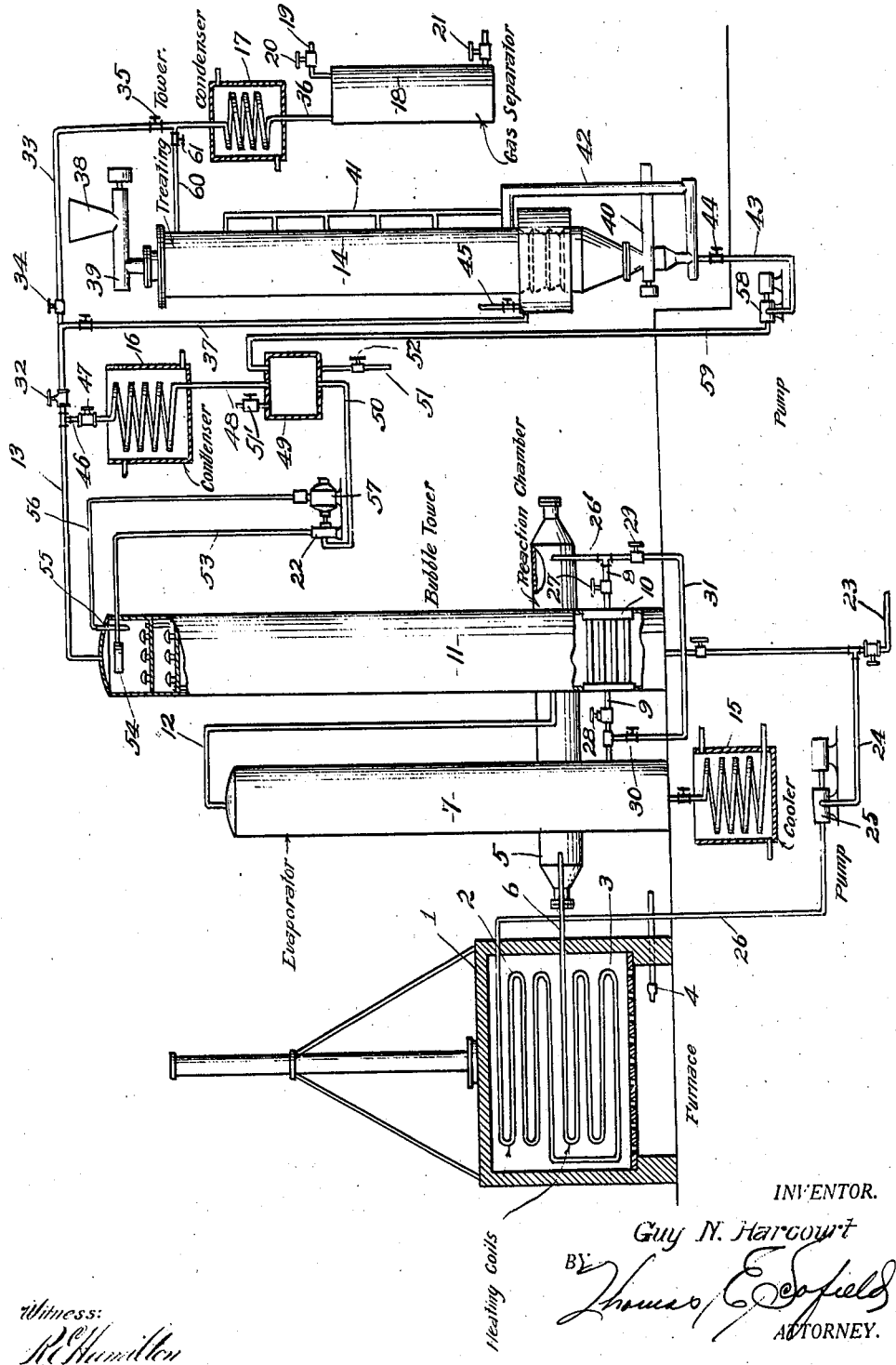

2,017,860

UNITED STATES PATENT OFFICE 2,017,860

PROCESS AND APPARATUS FOR PRODUCING LIGHT HYDROCARBONS

Guy N. Harcourt, Kansas City, Mo., assignor, by mesne assignments, to Cross Development Corporation, a corporation of Delaware Application May 7, 1925, Serial No. 28,640

12 Claims. (Cl. 196—96)

This invention relates to improvements in a process and apparatus for producing light hydrocarbons and refers more particularly to a process in which the final overhead hydrocarbon products or hydrocarbon fractions discharged from the dephlegmating stage are of a character determined and controlled to permit substantially only those fractions desirable in the final product to pass through a purifying or refining stage.

Among the salient objects of the invention are, to provide a process which may consist of either a cracking system in which the hydrocarbons are subjected to conditions of high temperature and pressure to promote conversion, or to a process of atmospheric distillation in which the vapors are driven off from the oil body without any appreciable cracking reaction; to provide a process in which the vapors from systems of cracking or atmospheric distillation are subjected to a dephlegmating action in a refluxing tower the vapors discharged therefrom being regulated or controlled as to their end point temperature by the introduction of a distillate or condensate having substantially the characteristic of the material discharged from the tower; to provide a process in which this recycled condensate or distillate is formed by partially condensing a portion of the vapors passing off from the top of the tower and returning the same to be introduced in liquid form to comingle in intimate contact with the vapors in the upper portion of the dephlegmating element; to provide a process by means of which substantially only those vaporous fractions recovered as the final product or final distillate are subjected to the refining action in a purifying stage wherein the vapors are treated continuously.

The single figure is a diagrammatic side elevational view of the apparatus with parts in section and parts broken away.

Referring to the drawing, at 1 is shown a furnace in which are mounted the preheating coils 2 and the heating coils 3. The furnace is preferably heated by means of gas burners diagrammatically shown at 4. 5 is a reaction chamber connected to the discharge from the heating coil through a transfer line 6. 7 is an evaporating tower connected to the transfer lines 8 and 9 between which is interposed a reboiling element 10 positioned in the bottom of the refluxing or dephlegmating tower 11 designated in the drawing as a bubble tower to characterize the construction of the particular unit. The evaporator is connected by the vapor line 12 to the bubble tower, while the bubble tower in turn has a vapor line connection 13 with the purifying tower 14. Numeral 15 indicates a cooler for residue from evaporator 7. Condensers are diagrammatically shown at 16 and 17. Eighteen is a gas separator from which the uncondensed gaseous products are removed through the line 19 controlled by a valve 20 while the liquid products are withdrawn through a lower valve 21.

It will be noted that the invention comprising that portion of the system between the bubble tower and the purifying tower and consisting of a condenser 16 for condensing a portion of the vapors passing off through the line 13 and a pump 22 for returning this condensed liquid back into the top of the tower and thermostatic control for the pump hereinafter explained is positioned in a cracking system practiced by the Gasoline Products Company, licensors of the Cross cracking system. No claim is made to any details in the purifying tower, which invention is a subject matter of a separate application Serial No. 19,856, filed April 1st, 1925, in the name of Roy Cross. This application has matured into Patent No. 1,882,000 dated October 11, 1932. It will be noted that the invention is as applicable to any cracking system or to any atmospheric distillation system to which is attached a purifying stage and where it is an advantage to limit the refining treatment to substantially only those hydrocarbon fractions which are to constitute the materials contained in the final product or final distillate.

The charging stock, which may consist of any suitable cracking stock, including kerosene distillate, gas oil, fuel oil or derivatives thereof, is introduced to the system from any convenient source through the inlet pipe 23. This charging oil passes thence through the line 24 to the pump 25 from which it is discharged through the line 26 into the preheating coil 2; thence through the heating coil 3, being discharged in a highly heated condition into the reaction chamber 5. In this particular type of system, the oil, while being heated and while undergoing digestion or cracking in the reaction stage, is maintained under pressures in excess of 500 pounds per square inch to prevent, insofar as it is possible, vaporization of the hydrocarbons. The velocity of the oils through the heating coils, together with the temperatures to which the tubes are subjected, is governed to prevent carbonization or deposition and accumulation of carbonaceous material in the tubes while at the same time transmitting sufficient heat to the oil to furnish the proper degree of cracking in the reaction chamber. The oil, on being discharged from the reaction stage, passes through the line 26' into the transfer line 8, thence through the reboiling element 10 and line 9 into the evaporator, or, by closing the valve 27 and valve 28 and opening the valves 29 and 30, the cracked material may be bypassed around the reboiling element 10 and introduced directly into the evaporator 7 from the reaction chamber. In any event, the pressure is reduced on its discharge from the reaction chamber by means of either the valve 29 or 30 in the bypass line 31 or by one of the valves 27 or 28 in the lines 8 and 9, respectively, according to whichever transfer line may be in use.

On introduction to the evaporator, the lighter or lower boiling point fractions distill off passing overhead through the line 12 into the bubble tower 11 where the vapors rise in an opposed direction to the liquid material in the tower separated from the vapors as they gradually cool upon nearing the upper part of the tower. The unvaporized material is withdrawn from the bottom of the evaporator into the cooler 15 and is thence directed to fuel oil storage. The uncondensed vapors pass off through the line 13 regulated by a valve 32 and may be directed immediately through the line 33 controlled by the valves 34 and 35 to the condenser 17, thence to the gas separator 18 through a connecting line 36 or by closing the valves 34 and 35 the vapors are directed through the line 37 which is connected to the purifying tower 14. As previously mentioned, the purifying tower is similar in construction to that explained in detail in the application in the name of Roy Cross, Serial No. 19,856, filed April 1st, 1925. The vapors pass up through the tower while an adsorbent treating material is continuously fed from a hopper 38 by means of a screw conveyor 39 into the top of the tower and is discharged from the bottom of the tower by means of a second screw conveyor 40. The treating material consists of highly adsorptive material such hydrous aluminum silicate, the typical form of which is known commercially as bentonite, or other similar adsorptive clays, including fuller's earth, or other organic or inorganic material capable of deodorizing, decolorizing and desulphurizing vaporous hydrocarbons. Condensates separated out during treatment are collected from secondary lines into the downcomer pipe 41 and standpipe 42 from which they may be withdrawn continuously or intermittently through the line 43 regulated by a valve 44. The uncondensed vapors are withdrawn through the vapor line 60, controlled by valve 61, and thence through the condenser 17. Steam may be supplied to the tower through the pipe 45.

Referring now to the novelty concerned in the operation of this particular apparatus, there is interposed, between the bubble tower and the purifying tower, a condenser 16 into which a portion of the vapors passing through the line 13 are directed by a line 46 controlled by a valve 47. These vapors passing into the condenser are drawn off as distillate through the pipe 48 into an accumulator or surge tank 49. This surge tank is equipped with a discharge line 50 connected with the suction side of the pump 22 and with an auxiliary drawoff and cleanout pipe 51 controlled by a valve 52. The accumulator 49 may also be provided with a conventional vent 51' for removing uncondensed gases. The discharge from the pump 22 is directed through the line 53 and is introduced into the top of the tower in the form of a spray diagrammatically shown at 54. In the top of the tower is also positioned a thermostat or thermocouple 55 having electric connections 56 to the motor 57 which drives the pump 22. The details of the thermo control, utilized to regulate the speed of the motor and the amount of material returned to the top of the tower, forms no part of the present invention, but is preferably a system such as that built and marketed by the Brown Instrument Company. The thermostat may be set at a temperature which will permit only those fractions which have the desired end point for the final product or distillate recovered in the gas separator 18 to pass through the vapor line 13. In order that this end point temperature may be accurately maintained, a portion of the vapors passing overhead through the vapor line 13 is shunted out through the condenser 16, condensed, and the condensate is immediately charged back into the top of the tower where it is redistilled and serves as a control medium for preventing any considerable variance in the temperatures existing in the top of the tower. It has been found in actual practice that a variance of from 2° to 5° are maximum under ordinary operation when a control device of the character is interposed in a vapor line between the dephlegmating tower and the purifying stage. By limiting the hydrocarbons passing through the purifying stage to substantially those fractions recovered as a final end point distillate there are eliminated a multitude of fractions which would normally pass to the purifying tower with the gases and vapors and would there be separated out in the form of condensate, imposing upon the purifying tower additional work and utilizing refining material upon fractions which are not recovered as end point products. By limiting the materials within a relatively narrow range, and eliminating fractions outside of this range, more efficient operation can be effected involving economies in the use of the treating substance.

Condensates separated out in the tower are withdrawn through the line 43 and returned by means of a pump 58 and line 59 to the accumulator tank 49.

I claim as my invention:

1. A process for producing light hydrocarbons, comprising the steps of cracking the oils by heat and pressure, dephlegmating the vapors, passing the dephlegmated vapors to a purifying stage and limiting the hydrocarbon fractions passed to the purifying stage to those fractions having a range of boiling point temperatures and an end point temperature substantially within the range of the boiling point temperatures of the desired final product recovered by withdrawing a portion of the vapors passing from the dephlegmating to the purifying stage, condensing the portion so withdrawn, and contacting the condensate with the vapors being dephlegmated.

2. An apparatus for producing light hydrocarbons comprising a vaporizer, a dephlegmator connected with the vaporizer, a purifier in fluid communication with the dephlegmator and adapted to receive vapors therefrom, means interposed between the dephlegmator and purifier to divert and condense a portion of the vapors and means for returning condensate thereby obtained to the dephlegmator.

3. An apparatus for producing light hydrocarbons comprising a dephlegmator for oil vapors, a purifier, means to direct vapors from the dephlegmator through the purifier, means interposed between the purifier and dephlegmator to divert and condense a portion of the vapors from the dephlegmator, means to direct the condensate to the dephlegmator and thermostatic means adapted to regulate the quantity of condensate introduced to the dephlegmator.

4. A process of producing light hydrocarbons comprising cracking oil, passing oil vapors to a dephlegmating stage, passing dephlegmated vapors to a purifying stage, withdrawing and condensing vapors from the purifying stage, diverting a portion of the vapors from the dephlegmator through an intermediate condensing stage and admitting a regulated quantity of the condensate from the intermediate stage to the dephlegmator to control the character of the vapors emitted therefrom.

5. The process of separating cracked hydrocarbons of different boiling points containing a mixture of cracked hydrocarbon vapors including naphtha which it is desired to separate and of economically purifying the desired naphtha, which comprises subjecting said hydrocarbons to reflux condensation at the temperature required to effect condensation of higher-boiling hydrocarbons and to separate as vapors approximately the desired naphtha hydrocarbons, dividing the said separated naphtha vapors leaving the locus of reflux condensation into two vapor streams of like constituents, purifying the vapors of only one stream, separately condensing the purified vapors comprising one stream and the unpurified vapors comprising the other stream, and returning the unpurified condensate to the locus of reflux condensation and thereat utilizing the same as reflux in the reflux condensation of the mixture of hydrocarbon vapors.

6. A process for producing light hydrocarbons which comprises dephlegmating oil vapors including said hydrocarbons, subjecting the vapors to a purifying step and condensing the dephlegmated and purified vapors, diverting and condensing a portion of the dephlegmated vapors previous to such purification step and returning a mixture of the unpurified condensate thereby obtained and liquid formed during the purification step for contact with the vapors being dephlegmated.

7. The process of treating hydrocarbons to recover therefrom gasoline hydrocarbons in refined form, which comprises distilling hydrocarbon oil and dephlegmating the resultant vapors to condense and separate constituents boiling above the desired gasoline boiling-point range, removing vapors from the dephlegmation zone, diverting and condensing a portion of said vapors and returning the condensate thereby obtained to the dephlegmation zone as a reflux, passing the remaining portion of the vapors to a purifying zone wherein it is subjected to contact essentially in the vapor phase with a solid purifying material, and thereafter condensing the desired treated gasoline hydrocarbons.

8. The process of separating cracked hydrocarbons of different boiling points containing a mixture of cracked hydrocarbon vapors including naphtha which it is desired to separate and of economically purifying the desired naphtha, which comprises subjecting said hydrocarbons to reflux condensation at the temperature required to effect condensation of higher-boiling hydrocarbons and to separate as vapors approximately the desired naphtha hydrocarbons, dividing the said separated naphtha vapors leaving the locus of reflux condensation into two vapor streams of like constituents, purifying the vapors of only one stream by subjecting said vapors to contact with a solid adsorbent catalytic material capable of promoting polymerization of undesired gum-forming constituents, separately condensing the purified vapors comprising one stream and the unpurified vapors comprising the other stream, and returning the unpurified condensate to the locus of reflux condensation and thereat utilizing the same as reflux in the reflux condensation of the mixture of hydrocarbon vapors.

9. The process of treating hydrocarbons to recover therefrom gasoline hydrocarbons in refined form, which comprises distilling hydrocarbon oil and dephlegmating the resultant vapors to condense and separate constituents boiling above the desired gasoline boiling-point range, removing vapors from the dephlegmation zone, diverting and condensing a portion of said vapors and returning the condensate thereby obtained to the dephlegmation zone as a reflux, passing the remaining portion of the vapors to a purifying zone wherein it is subjected to contact essentially in the vapor phase with a solid purifying material, condensing some vapors in the purifying zone, returning these vapors to the dephlegmating zone, and thereafter condensing the desired treated gasoline hydrocarbons from the vapors uncondensed in the purifying zone.

10. The process of recovering refined gasoline hydrocarbons from mixed hydrocarbon vapors resulting from the distillation or cracking of hydrocarbon oil, which comprises passing such vapors through a dephlegmating zone wherein constituents boiling above the desired gasoline boiling-point range are condensed and separated, removing vapors from the dephlegmating zone, diverting and condensing a portion of said vapors and returning the liquid condensate thereby obtained to contact with the vapors passing through said dephlegmating zone as a reflux for said vapors, passing a further portion of the vapors to a purifying zone wherein it is contacted with a solid adsorbent material effective to selectively promote polymerization of undesired unstable constituents while essentially in the vapor phase, allowing some vapors to be condensed in the purification zone, thereafter subjecting the thereby treated vapors which remain uncondensed to condensation to recover desired refined gasoline constituents while returning the vapors condensed in the purification zone to contact with the vapor passing through the dephlegmating zone.

11. The process of separating hydrocarbons of different boiling points containing a mixture of hydrocarbon vapors including low boiling hydrocarbons which it is desired to separate and of economically purifying the low boiling product desired, which comprises subjecting said hydrocarbons to reflux condensation at the temperature required to effect condensation of higher boiling hydrocarbons and separate as vapors approximately the desired lower boiling hydrocarbons, removing from the locus of reflux condensation said separated low boiling vapors in two vapor streams of like constituents, purifying the vapors of only one stream, separately condensing the purified vapors comprising one stream and the unpurified vapors comprising the other stream, and returning the unpurified condensate to the locus of reflux condensation and thereat utilizing the same as the primary refluxing liquid in the reflux condensation of the mixture of hydrocarbon vapors.

12. The process of separating hydrocarbons of different boiling points containing a mixture of hydrocarbon vapors including low boiling hydrocarbons which it is desired to separate and of economically purifying the low boiling product desired, which comprises subjecting said hydrocarbons to reflux condensation at the temperature required to effect condensation of higher boiling hydrocarbons and separate as vapors approximately the desired lower boiling hydrocarbons, removing from the locus of reflux condensation said separated low boiling vapors in two vapor streams of like constituents, purifying the vapors of only one stream, separately condensing the purified vapors comprising one stream and the unpurified vapors comprising the other stream, returning the unpurified condensate to the locus of reflux condensation and thereat utilizing the same as the primary refluxing liquid in the reflux condensation of the mixture of hydrocarbon vapors, and maintaining substantially uniform the temperature of the vapors outflowing from the locus of reflux condensation by regulating the temperature and rate of return flow of the low boiling unpurified condensate to the locus of reflux condensation.

GUY N. HARCOURT.